May 10, 1927. 1,627,782
C. G. KIME
COTTON SEED CLEANER
Filed March 17, 1926  2 Sheets-Sheet 1

Inventor
C. G. Kime,
By Lacey & Lacey, Attorneys

May 10, 1927.
C. G. KIME
1,627,782
COTTON SEED CLEANER
Filed March 17, 1926   2 Sheets-Sheet 2
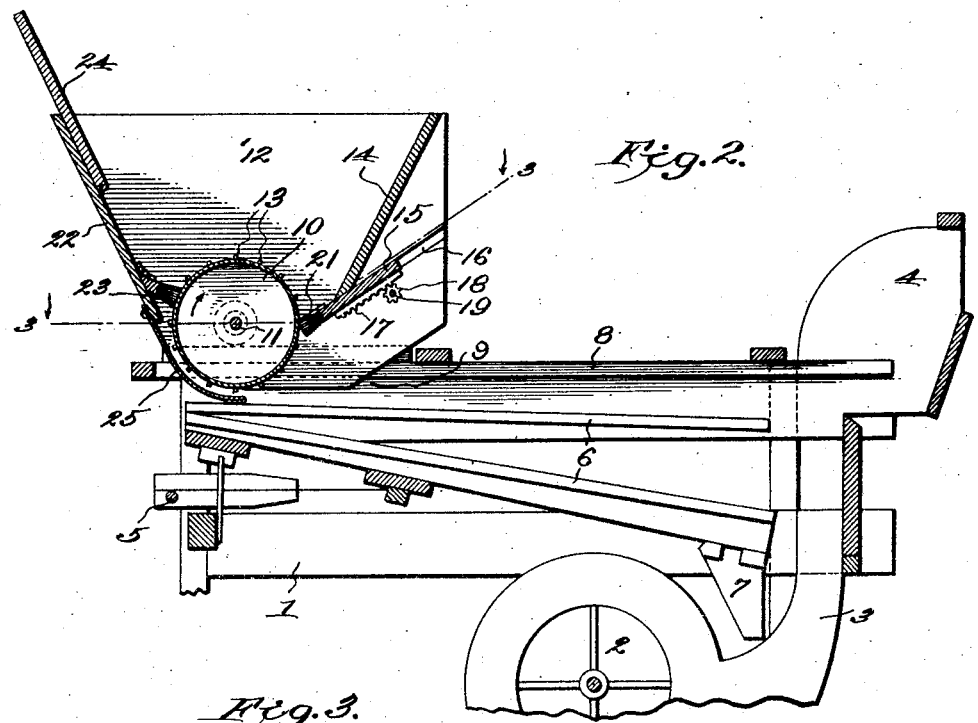
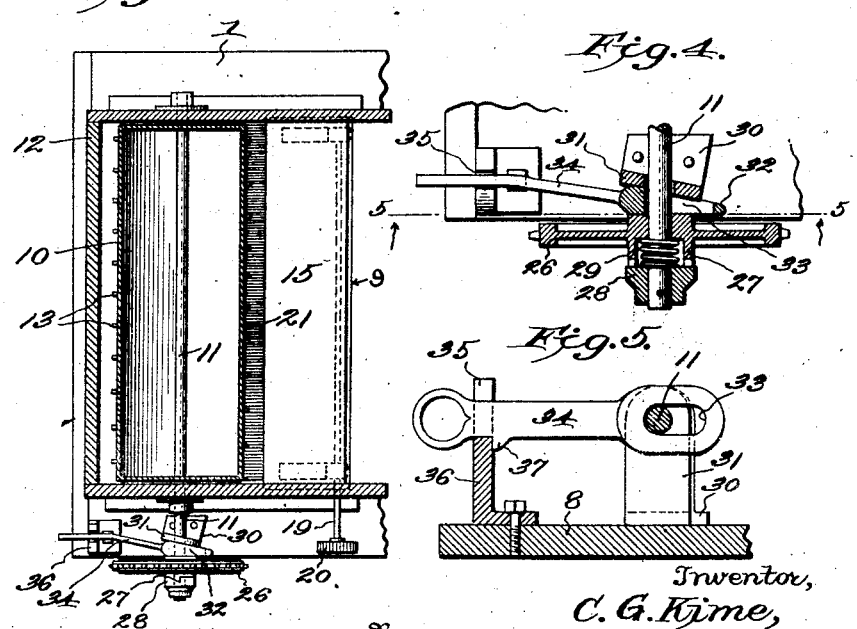
Inventor,
C. G. Kime,
By Lacey & Lacey, Attorneys Patented May 10, 1927.

1,627,782

UNITED STATES PATENT OFFICE.

CHARLES G. KIME, OF CRESTLINE, OHIO, ASSIGNOR TO THE BURCH PLOW WORKS CO., OF CRESTLINE, OHIO, A CORPORATION OF OHIO.

COTTONSEED CLEANER.

Application filed March 17, 1926. Serial No. 95,413

This invention relates to seed cleaners and has special reference to means for separating cotton seed so that the seed will not pass to the screens in bunches. The invention also seeks to provide means whereby the feeding drum may be kept in a clean condition to efficiently act upon the seed, another object of the invention being to provide means whereby the flow of seed to the drum may be easily controlled. A still further object of the invention is to provide means whereby seed which might pass to the rear of the feeding drum or roller will be saved and directed onto the grading screens. Other objects of the invention will appear incidentally in the course of the following description.

The invention is illustrated in the accompanying drawings and in said drawings—

Fig. 2 is a central vertical longtudinal section of the upper portion of the machine;

Fig. 3 is a section on the line 3—3 of Fig. 2;

Fig. 4 is a detail view showing the clutch mechanism for controlling the feeding drum in horizontal section;

Fig. 5 is a detail section on the line 5—5 of Fig. 4.

Figure 1:
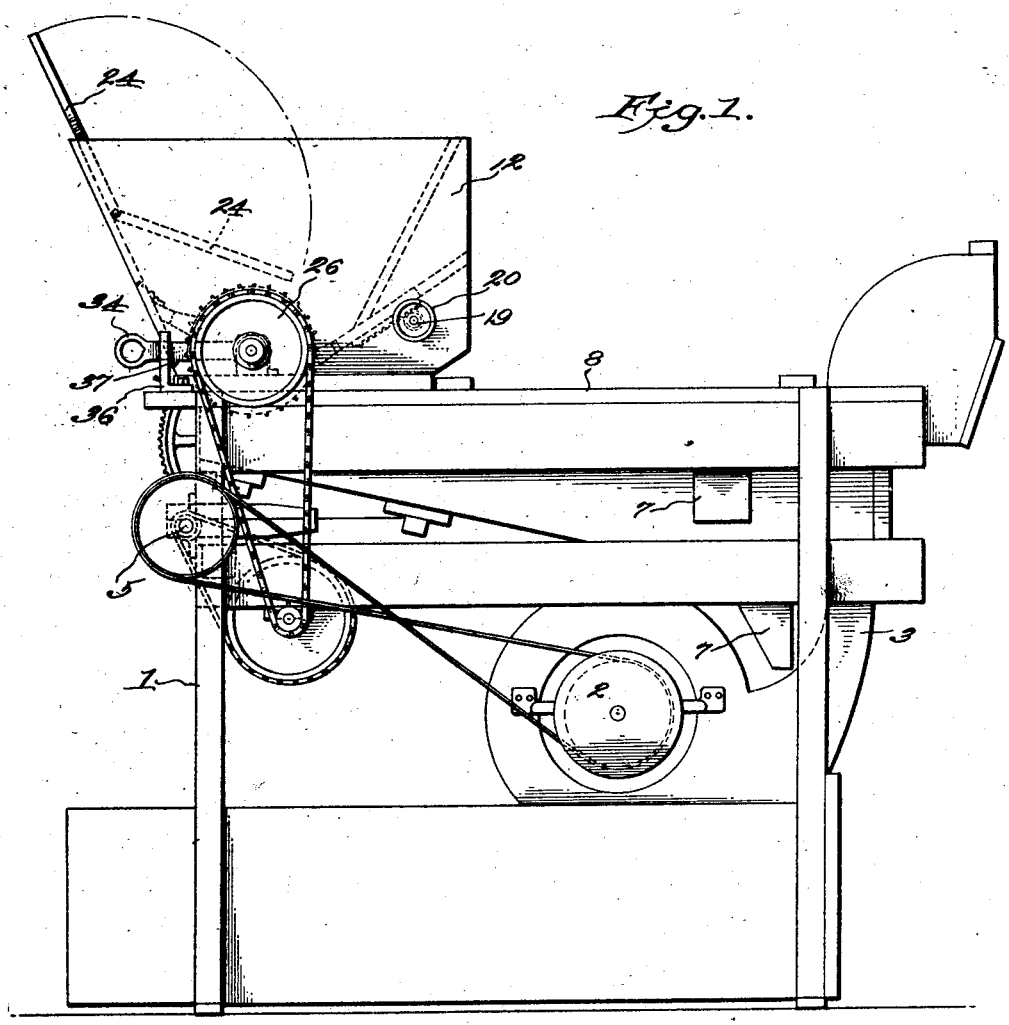
Figure 1 is a side elevation of a seed-cleaning machine embodying the invention.

The main frame 1 of the machine may be of any approved construction and houses a fan or suction device 2 from which an outlet spout 3 rises past the end of the frame to discharge through an opening 4. This fan or suction device may be of any approved type and is driven from a main shaft 5 mounted upon the main frame in an obvious manner. Above the fan or suction device within the frame are a plurality of screens 6 having mesh of different sizes so that the seed received thereon may be graded and delivered to proper receptacles through lateral discharge spouts, indicated at 7.

The top of the main frame is equipped with strips 8 upon which the hopper rests, a feeding drum or roller 10 being arranged at one end of the frame. The roller is carried by a shaft 11 which extends through the drum and is journaled in the side walls of a hopper 12 supported upon the strips 8 around the opening 9, as shown. This feeding drum or roller is provided throughout its circumference with projections 13 which may conveniently be pins set into the material of the drum to project radially therefrom and pass through the mass of seed deposited in the hopper as the machine is operated. The front and rear walls of the hopper converge downwardly toward the roller, as shown clearly in Fig. 2, and the front wall 14 terminates in spaced relation to the drum or roller, a slide 15 being mounted immediately adjacent the lower edge of said wall in inclined grooves 16 formed in the side walls of the hopper. This slide constitutes a valve or cut-off whereby the outlet of the hopper may be varied in dimensions, and, to effect adjustment of the valve, racks 17 are formed on its under side at its ends to be engaged by pinions 18 carried by a shaft 19 which is journaled in and extends through the side walls of the hopper and is equipped at one end with a hand wheel 20 whereby it may be rotated. The lower edge of the valve carries bristles or a brush 21 which projects toward the feeding drum or roller to engage the surface of the same so that by the rotation of the said drum or roller the seed will be forced through the brush and all bunches will be torn apart and the seed separated, the seed passing out through the opening 9 onto the upper screen 6 in an obvious manner.

To the rear wall 22 of the hopper, I pivotally or hingedly secure a brush 23 which is adapted to project from said wall and bear upon the upper rear portion of the feeding drum or roller so that any lint or other matter which may be adhering to the same will be swept therefrom and the drum thus kept in proper working condition. Should the lint accumulate in the hopper in rear of the feeding drum or roller or upon the brush 23 to such an extent as to detract from the efficiency of the machine, the brush 23 may be swung upwardly so as to rest upon the rear wall 22 and thereby permit access to the rear of the drum or roller for removing the accumulation. Above the brush 23, there is also pivotally or hingedly secured upon the wall 22 a guard or deflector plate 24 which fits closely between the side walls of the hopper and may be swung downwardly, as indicated in dotted lines in Fig. 1, to project forwardly over the drum or roller and thereby prevent the seed packing on top of the latter. While the machine is intended more particularly for cleaning cotton seed, it is well adapted for cleaning other seed and when other seed is being cleaned it is desirable to retard the flow of the same to the drum so that the projections thereon will not mutilate the seed. When cleaning cotton seed, it is desirable to provide ample opportunity for the projections or pins 13 to engage the lint and work through the mass of seed so as to cause positive flow of the seed to and through the brush 21 whereby the seed will be separated instead of passing to the screens in bunches.

Under some conditions, a part of the seed is carried rearwardly with the feeding drum or roller after passing through the brush 21 and this seed has heretofore been lost inasmuch as it passed over the rear ends of the screens and dropped to the ground. To meet this condition, I provide a guard 25 which may conveniently be a sheet metal plate secured to the rear wall 22 of the hopper and projecting downwardly and forwardly therefrom on an arc extending along the feeding drum or roller so that any seed which may be carried rearwardly by the drum will be caught by this guard and deflected thereby onto the upper screen.

The drum-carrying shaft 11 is rotated through a sprocket wheel or pulley 26 which is connected with the main driving shaft through any convenient or approved gearing. The sprocket wheel or pulley is loose upon the shaft, as shown clearly in Fig. 4, and upon its outer side has a clutch hub 27 cooperating with and adapted to engage a clutch jaw 28 fixed upon the end of the shaft, a hub 27 being hollow and housing an expansion spring 29 bearing at its ends against the clutch jaw 28 and the base of the clutch hub, as shown clearly in Fig. 4. This spring normally holds the sprocket wheel out of engagement with the clutch jaw so that the wheel will rotate free upon the shaft 11, and when it is desired to operate the feed drum or roller the wheel is shifted outwardly along the shaft so that the clutch faces are brought into engagement and the shaft will then rotate with the wheel. Upon the main frame, adjacent the inner face of the sprocket wheel, is secured a bracket 30 having an upstanding abutment 31, which is obliquely disposed relative to the sprocket, and fitting between this upstanding abutment and the inner face of the wheel at the hub thereof is a wedge 32 which is provided with a longitudinal slot 33 receiving the shaft 11 therethrough so that the wedge will be slidably supported by the shaft between the abutment and the hub of the wheel. A handle member 34 projects rearwardly from the wider end of the hub and passes through a notch 35 in the upper end of a guiding and holding arm 36 secured upon the main frame. The handle member 34 is provided on its under edge with a lug or tooth 37 which is adapted to engage against the front face of the guide 36, as shown in Fig. 5, and thereby hold the wedge in its forward operative position and maintain the clutch faces in engagement, as will be understood upon reference to Figs 4 and 5, so that the feed drum or roller will rotate. The engagement of the clutch faces, however, may be instantly released by merely lifting the lug or tooth 37 out of engagement with the guide 36 and then drawing rearwardly upon the wedge through the handle member 34, the spring 29 responding instantly to this movement so that the clutch faces will be separated and the rotation of the drum arrested. This facility of stoppage will be found highly advantageous in the event that some foreign object should become embedded in the mass of seed and by its contact with the drum or other working part tend to break or otherwise damage some of the essential elements of the machine.

The operation is thought to be clear from the foregoing description, taken in connection with the accompanying drawings. The seed to be cleaned is deposited in the hopper and the feed drum or roller rotated in the direction indicated by the arrow in Fig. 2, the valve or cut-off 15 being properly adjusted. The drum or feed roller will work through the mass of seed and the projections thereon will agitate and loosen the seed so that clogging at the brush 21 will be avoided and seed will be carried through the brush by the projections 13, the brush bristles and said projections cooperating to separate the seed and break up all bunches before the seeds drop onto the upper screen. The screens operate in the usual manner of seed-cleaning machines so that the seed will pass through or over the screens according to their sizes and will be automatically graded and delivered into the proper receptacles, the blast from the fan 2 blowing away all dirt. The machine is very simple in construction, is easily operated and is highly efficient in use.

Having thus described the invention, I claim:

1. In a seed-cleaning machine, a hopper, a feeding drum rotatably mounted in the hopper and provided with projections upon its circumferential surface, and a brush mounted in the hopper at the bottom thereof in the path of the projections on the drum.

2. In a seed-cleaning machine, a hopper, a feeding drum rotatably mounted in the hopper at the discharge thereof and provided with projections upon its circumferential surface, a brush mounted in the hopper to extend into the path of the projections on the feeding drum, and means for adjusting said brush toward or from the drum.

3. In a seed-cleaning machine, a hopper, a feeding drum rotatably mounted in the hopper and provided with projections upon its circumferential surface, a slide mounted in the hopper in front of the drum, a brush carried by said slide to extend into the path of the projections on the drum, racks on the under side of the slide, pinions meshing with said racks, and means for manually rotating the pinions.

4. In a seed-cleaning machine, a hopper, a feeding drum rotatably mounted in the hopper, a brush arranged to cooperate with the front portion of the drum, and a brush hingedly mounted upon the back of the hopper in position to bear upon the drum.

5. In a seed-cleaning machine, a hopper, a drum rotatably mounted in the hopper, a brush cooperating with the drum, and a deflecting plate pivotally mounted upon the rear wall of the hopper and adapted to project therefrom downwardly and forwardly over the drum.

6. In a seed cleaner, the combination of a hopper, a feeding drum rotatably mounted in the hopper, a shaft carrying said drum, a driving wheel loosely mounted upon the said shaft at one side of the hopper, a fixed abutment arranged at the inner side of said wheel and in spaced relation thereto, a wedge slidably mounted at the shaft between said abutment and the wheel and engaging the opposed faces of the abutment and the wheel, a hollow clutch hub upon the outer side of the wheel, a clutch member fixed upon the shaft at the outer side of said clutch hub, and an expansion spring housed in the said hub and tending to separate the same and the clutch member.

In testimony whereof I affix my signature.

CHARLES G. KIME. [L. S.]